US012447079B2

(12) United States Patent
Borgman et al.

(10) Patent No.: US 12,447,079 B2
(45) Date of Patent: Oct. 21, 2025

(54) MATTRESS RETENTION ASSEMBLY AND RADIOFREQUENCY WELD IN SURFACE COVERS

(71) Applicant: Hill-Rom Services, Inc., Batesville, IN (US)

(72) Inventors: Douglas Borgman, Brookville, IN (US); Jnanesha Ramegowda, Batesville, IN (US); David Newkirk, Lawrenceburg, IN (US); Jason Brennan Grace, Cincinnati, OH (US); Brian Guthrie, Greensburg, IN (US); Eric R. Meyer, Batesville, IN (US); Darrell L. Borgman, Batesville, IN (US); Nicole Johannigman, Greensburg, IN (US); Rachel L Williamson, Batesville, IN (US); Michael Churilla, Harrison, OH (US); James Evans, Greensburg, IN (US); Taylor Franklin, Batesville, IN (US); Catherine Marie Wagner, Osgood, IN (US); Keith Moores, Milan, IN (US); Katherine Lin, Broomfield, CO (US)

(73) Assignee: Hill-Rom Services, Inc., Batesville, IN (US)

( * ) Notice: Subject to any disclaimer, the term of this patent is extended or adjusted under 35 U.S.C. 154(b) by 230 days.

(21) Appl. No.: 18/214,258

(22) Filed: Jun. 26, 2023

(65) Prior Publication Data

US 2023/0329939 A1 Oct. 19, 2023

Related U.S. Application Data

(62) Division of application No. 16/844,054, filed on Apr. 9, 2020, now Pat. No. 11,684,530.

(Continued)

(51) Int. Cl.
*A61G 7/00* (2006.01)
*A61G 7/065* (2006.01)
(Continued)

(52) U.S. Cl.
CPC .............. *A61G 7/065* (2013.01); *B29C 65/04* (2013.01); *B29L 2031/751* (2013.01)

(58) Field of Classification Search
CPC ...... A61G 7/00; A61G 7/065; A61G 7/05715; A61G 7/05; B29C 65/04; B29L 2031/751
See application file for complete search history.

(56) References Cited

U.S. PATENT DOCUMENTS 1,559,119 A 10/1925 Miller
3,928,898 A 12/1975 Smoot
(Continued)

FOREIGN PATENT DOCUMENTS

CH 593041 A5 11/1977
CN 2819947 Y 9/2006
(Continued)

OTHER PUBLICATIONS

Invacare, "Therapeutic Support Surfaces," 28 pages.

*Primary Examiner* — Fredrick C Conley
(74) *Attorney, Agent, or Firm* — Price Heneveld LLP

(57) ABSTRACT

A mattress assembly includes a mattress and an outer mattress shell that covers the mattress and has a patient support portion and a sleep deck portion. The outer mattress shell defines an interior surface and an exterior surface. A bonding strip is coupled to the interior surface of the outer mattress shell and a fastening strip is coupled to the exterior surface of the outer mattress shell. A weld extends through the exterior surface and through the interior surface of the outer mattress shell. A clasp locker is operably coupled to the fastening strip and detachably couples the patient sup- (Continued)

port portion to the sleep deck portion of the outer mattress shell.

20 Claims, 11 Drawing Sheets

Related U.S. Application Data

(60) Provisional application No. 62/833,389, filed on Apr. 12, 2019.

(51) Int. Cl.
*B29C 65/04* (2006.01)
*B29L 31/00* (2006.01)

(56) References Cited

U.S. PATENT DOCUMENTS

| | | | |
|---|---|---|---|
| 4,352,217 | A | 10/1982 | O'Rourke |
| 4,541,137 | A | 9/1985 | Murray |
| 5,005,239 | A | 4/1991 | Clark |
| 5,522,645 | A | 6/1996 | Dahlbacka |
| 5,528,780 | A | 6/1996 | Taylor |
| 6,286,166 | B1 | 9/2001 | Henley et al. |
| 6,715,173 | B2 | 4/2004 | Barman et al. |
| 6,889,396 | B2 | 5/2005 | Weinman |
| 7,047,579 | B2 | 5/2006 | Piana et al. |
| 7,051,388 | B1 | 5/2006 | Taddeo |
| 7,810,194 | B2 | 10/2010 | Clenet |
| 8,176,582 | B2 * | 5/2012 | Beard .................. A47C 21/026 5/691 |
| 8,856,985 | B2 * | 10/2014 | Rensink ................. A47C 21/02 5/503.1 |
| 9,107,782 | B2 * | 8/2015 | Ermalovich ......... A47C 31/105 |
| 9,173,793 | B2 | 11/2015 | Rawls-Meehan |
| 9,578,975 | B2 | 2/2017 | Rawls-Meehan et al. |
| 9,814,324 | B2 | 11/2017 | Scarleski |
| 9,986,844 | B2 | 6/2018 | Shih |
| 2005/0273941 | A1 | 12/2005 | Stolpman et al. |
| 2006/0117479 | A1 | 6/2006 | Kawakami et al. |
| 2010/0229309 | A1 | 9/2010 | Goldsmith |
| 2011/0113553 | A1 | 5/2011 | Johan et al. |
| 2011/0138533 | A1 | 6/2011 | Rippe et al. |
| 2013/0042412 | A1 | 2/2013 | Shih |
| 2013/0180050 | A1 | 7/2013 | Koci |
| 2013/0191993 | A1 | 8/2013 | Rawls-Meehan |
| 2014/0059778 | A1 | 3/2014 | Jalbert |
| 2014/0182060 | A1 | 7/2014 | Mikkelsen et al. |
| 2014/0259389 | A1 | 9/2014 | Hillenbrand et al. |
| 2015/0374136 | A1 | 12/2015 | Mikkelsen et al. |
| 2016/0206489 | A1 | 7/2016 | Rawls-Meehan et al. |
| 2016/0242558 | A1 | 8/2016 | Rawls-Meehan et al. |
| 2017/0035214 | A1 | 2/2017 | Srivastava et al. |
| 2017/0325594 | A1 | 11/2017 | Nishimura et al. |
| 2018/0027985 | A1 | 2/2018 | Ocegueda Gallaga et al. |
| 2018/0027998 | A1 | 2/2018 | Heiman et al. |
| 2018/0103771 | A1 | 4/2018 | Neuenswander et al. |
| 2018/0161225 | A1 | 6/2018 | Zerhusen et al. |

FOREIGN PATENT DOCUMENTS

| | | | |
|---|---|---|---|
| CN | 204091531 | U | 1/2015 |
| CN | 104510239 | A | 4/2015 |
| CN | 107485223 | A | 12/2017 |
| CN | 107485246 | A | 12/2017 |
| CN | 109303441 | A | 2/2019 |
| DE | 2306417 | A1 | 11/1973 |
| DE | 3841531 | A1 | 6/1990 |
| DE | 102010006491 | A1 | 8/2011 |
| EP | 1033098 | A1 | 9/2000 |
| EP | 1050250 | A1 | 11/2000 |
| EP | 1550386 | A1 | 7/2005 |
| FR | 2752707 | A1 | 3/1998 |
| FR | 3034655 | A1 | 10/2016 |
| GB | 1022392 | A | 3/1966 |
| GB | 1330324 | A | 9/1973 |
| GB | 2421426 | B | 6/2006 |
| GB | 2486042 | A | 6/2012 |
| GB | 2492572 | B | 1/2013 |
| KR | 200349776 | Y1 | 5/2004 |
| KR | 20130067399 | A | 6/2013 |
| KR | 20160121842 | A | 10/2016 |
| KR | 101938117 | B1 | 1/2019 |
| WO | 2003017905 | A2 | 3/2003 |
| WO | 2016076174 | A1 | 5/2016 |
| WO | 2016139313 | A1 | 9/2016 |
| WO | 2016096403 | A1 | 12/2016 |

* cited by examiner

MATTRESS RETENTION ASSEMBLY AND RADIOFREQUENCY WELD IN SURFACE COVERS

CROSS-REFERENCE TO RELATED APPLICATION

This application is a division of U.S. patent application Ser. No. 16/844,054, filed Apr. 9, 2020, now U.S. Pat. No. 11,684,530, entitled "MATTRESS RETENTION ASSEMBLY AND RADIOFREQUENCY WELD IN SURFACE COVERS," which claims the benefit under 35 U.S.C. § 119(e) to U.S. Provisional Patent Application No. 62/833,389, filed Apr. 12, 2019, entitled "MATTRESS RETENTION ASSEMBLY AND RADIOFREQUENCY WELD IN SURFACE COVERS," which is incorporated herein by reference in its entirety.

FIELD OF THE DISCLOSURE

The present disclosure generally relates to a mattress retention assembly and a radiofrequency weld on a surface cover. More specifically, the present disclosure relates to a mattress retention assembly and welds in surface covers for a hospital bed.

SUMMARY OF THE DISCLOSURE

According to one aspect of the present disclosure, mattress assembly includes a mattress and an outer mattress shell that covers the mattress and has a patient support portion and a sleep deck portion. The outer mattress shell defines an interior surface and an exterior surface. A bonding strip is coupled to the interior surface of the outer mattress shell and a fastening strip is coupled to the exterior surface of the outer mattress shell. A weld extends through the exterior surface and through the interior surface of the outer mattress shell. A clasp locker is operably coupled to the fastening strip and detachably couples the patient support portion to the sleep deck portion of the outer mattress shell.

According to another aspect of the present disclosure, a mattress assembly includes a mattress and an outer mattress shell that encases the mattress. The outer mattress shell includes a fold defined by a weld that extends through the outer mattress shell. A mattress retention assembly includes a retention feature that has a planar portion that extends below the outer mattress shell and a clasping portion. The retention feature includes a raised portion that is integrally formed with the planar portion.

According to yet another aspect of the present disclosure, a method for manufacturing a mattress includes forming the mattress with an outer mattress shell that includes a patient support portion and a sleep deck portion. The outer mattress shell defines an interior surface and an exterior surface. The method further includes applying at least one bonding strip to the interior surface of the outer mattress shell. The method further includes coupling a clasp locker to detachably couple the patient support portion of the outer mattress shell to the sleep deck portion proximate the at least one bonding strip. The method further includes applying electromagnetic energy to the outer mattress shell and the at least one bonding strip at an attachment site to operably couple the outer mattress shell with the at least one bonding strip. The method further includes applying pressure to the outer mattress shell and the at least one bonding strip at the attachment site.

These and other features, advantages, and objects of the present disclosure will be further understood and appreciated by those skilled in the art by reference to the following specification, claims, and appended drawings.

DETAILED DESCRIPTION

Figure 1A:
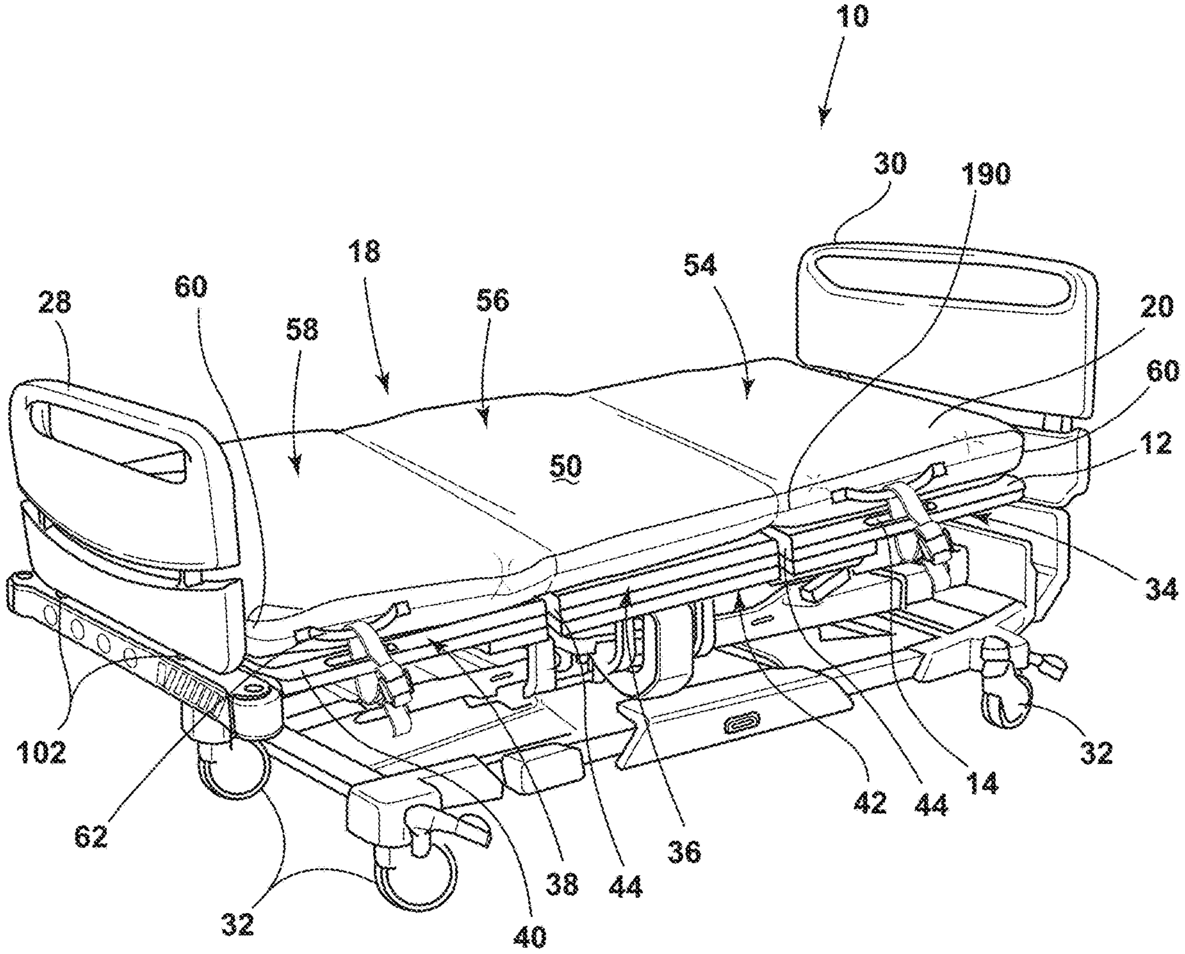
FIG. 1A is a top perspective view of a hospital bed of the present disclosure.

The present illustrated embodiments reside primarily in combinations of method steps and apparatus components related to a mattress retention assembly and a radiofrequency weld in a surface cover. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1A. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1A-10, reference numeral 10 generally designates a hospital bed that includes a sleep deck 12 that defines an opening 14. A mattress 18 is coupled to the sleep deck 12, and an outer mattress shell 20 is coupled to the mattress 18. The hospital bed 10 further includes a mattress retention assembly 22 having a first magnet 24 and a second magnet 26 that function to operably couple the mattress 18 with the sleep deck 12.

Throughout its use, the hospital bed 10 and the sleep deck 12 may be repositioned to suit the needs of the caregiver and/or user. For example, the caregiver may adjust the hospital bed 10 so that the user is in a seated or upright position. Traditionally, such repositioning may cause the mattress 18 to slip or shift relative to the sleep deck 12 of the hospital bed 10. The mattress retention assembly 22 minimizes sliding or shifting of the mattress 18 relative to the sleep deck 12, such that the caregiver can adjust the position of the hospital bed 10 as needed. In addition, the mattress retention assembly 22 also allows the caregiver to secure and/or detach the mattress 18 to the sleep deck 12, allowing a caregiver to easily clean and sterilize the hospital bed 10 between users, thereby decreasing the risk of infection or contamination and lengthening the functional life of the mattress 18.

With reference again to FIGS. 1A and 1B, in addition to the sleep deck 12, the illustrated hospital bed 10 also includes a footboard 28, a headboard 30, and supports 32. The supports 32 may be movable or stationary to ease potential repositioning or relocation of the hospital bed 10. In some instances, the footboard 28 may reposition along with the potential repositioning of the mattress 18 and sleep deck 12. Comparatively, the headboard 30 of the hospital bed 10 will typically remain stationary during repositioning of the mattress 18 and the sleep deck 12. Thus, the caregiver will use the mattress retention assembly 22 to secure the mattress 18 during such articulations where the headboard 30 remains stationary.

Figure 2A:
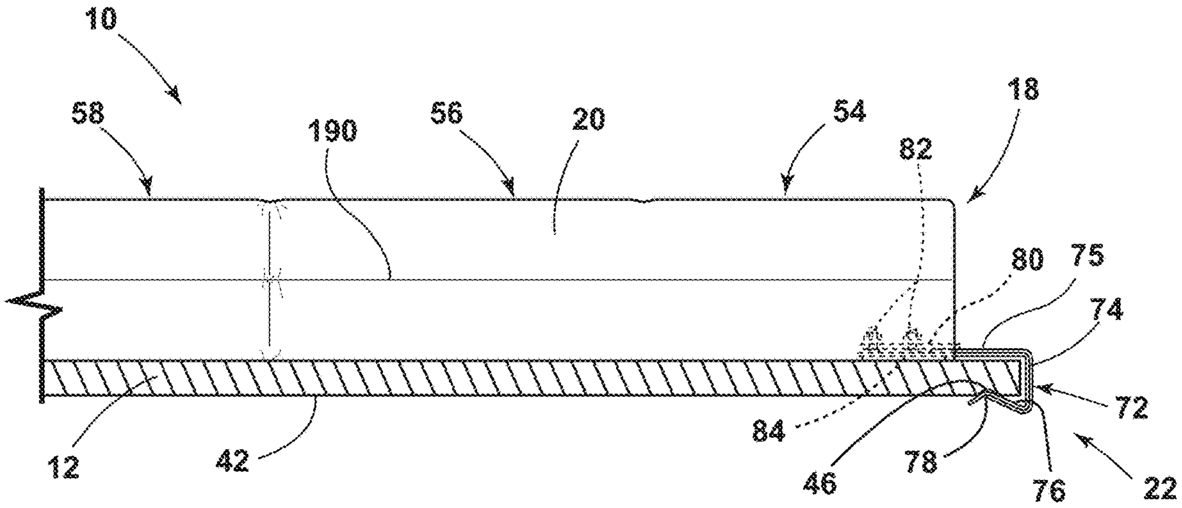
FIG. 2A is a side elevational view of a mattress retention assembly of the present disclosure attached to a hospital bed.

As illustrated, between the headboard 30 and the footboard 28, the sleep deck 12 includes an upper portion 34, a middle portion 36, and a lower portion 38. The upper portion 34, middle portion 36, and lower portion 38 collectively define a support surface 40 and an underbody 42 of the sleep deck 12. The upper portion 34, as shown, is configured to support the head and torso of the user. The middle and the lower portions 36, 38, as shown, are configured to support the lower back, buttocks, and leg regions of the user. It is generally contemplated that the sleep deck 12 may define spaces 44 at least partially separating the upper portion 34, the middle portion 36, and the lower portion 38. These spaces 44 allow for a generally hinged movement of the upper portion 34 of the sleep deck 12 relative to the middle portion 36 and the lower portion 38 relative to the middle portion 36. In addition, it is also contemplated that the underbody 42 of the sleep deck 12 may define notches 46 (FIG. 2A). As depicted, the notches 46 are used to further secure the mattress 18 to the sleep deck 12 by allowing the caregiver to fit the mattress retention assembly 22 within the notches 46 to prevent unwanted movement of the mattress 18 during repositioning.

With reference again to FIGS. 1A and 1B, the mattress 18 includes a top surface 48 and a bottom surface 49, and the outer mattress shell includes an interior surface 50 and an exterior surface 52, described in more detail below. The top and bottom surfaces 48, 49 of the mattress 18 further include a head portion 54, configured to support a head and torso of the user, a medial portion 56, configured to support a lumbar and buttocks of the user, and a foot portion 58, configured to support legs of the user, which correspond respectively with the upper, middle, and lower portions 34, 36, 38 of the sleep deck 12. Similarly, the head portion 54, the medial portion 56, and the foot portion 58 correspondingly identify portions of the outer mattress shell 20. Thus, specific portions (e.g., the upper and head portions 34, 54) of the sleep deck 12 and the mattress 18 can be adjusted to accommodate the needs of the user. Further, the mattress 18 and the outer mattress shell 20 include corner portions 60 discussed in more detail below with respect to FIGS. 9A and 9B. Proximate the corner portions 60, the outer mattress shell 20 includes a handle 62 (FIGS. 1A, 1B, and 4A) coupled to the outer mattress shell 20. The handle 62 may be configured to receive the mattress retention assembly 22, as illustrated. The caregiver may utilize the handle 62 along with the mattress retention assembly 22 to secure the position of the mattress 18 during various articulations.

Figure 2B:
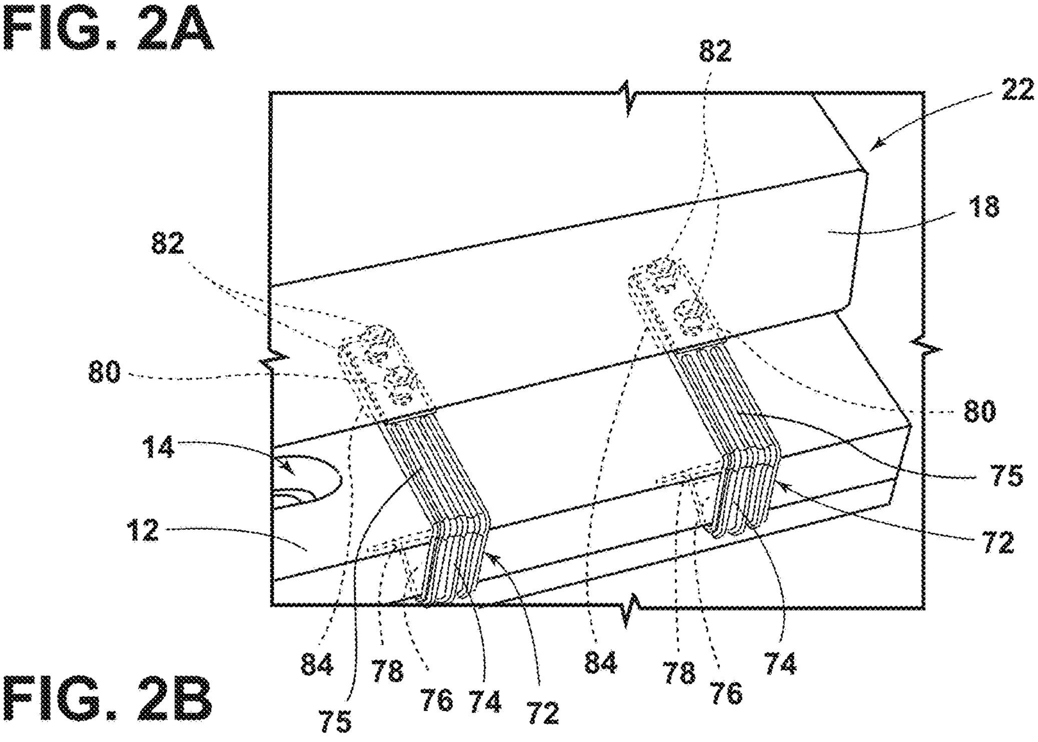
FIG. 2B is a partial top perspective view of a hospital bed and a hook of the present disclosure.
Figure 2C:
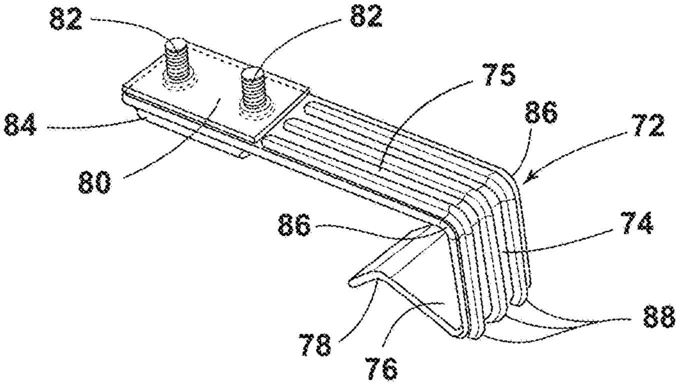
FIG. 2C is a front perspective view of a hook used to secure a mattress to a sleep deck of a hospital bed of the present disclosure.

With reference now to FIGS. 2A-2C, the mattress retention assembly 22 may include a retention feature 72 in the form of a hook that, as illustrated, includes a raised portion 74 and a planar portion 75 that together at least partially define a recessed portion 76. The recessed portion 76 is further defined by a clasping portion 78, described in further detail below. The retention feature 72 couples the mattress 18 to the sleep deck 12 during repositioning and articulation of the hospital bed 10. Stated differently, the retention feature 72 may prevent the mattress 18 from significant movement while the mattress 18 and the sleep deck 12 are adjusted. The recessed portion 76 of the retention feature 72 is configured to fit around an end of the sleep deck 12, while the raised portion 74 is configured to brace against the sleep deck 12 to maintain the functionality of the mattress retention assembly 22 by limiting significant shifting of the mattress 18 during repositioning.

As shown in FIG. 2A, the clasping portion 78 and the planar portion 75 couple the retention feature 72 to the sleep deck 12 via compressive force. The clasping portion 78 engages the underbody 42 of the sleep deck 12, and the planar portion 75 engages the support surface 40 of the sleep deck 12. Stated differently, the planar portion 75 extends between the outer mattress shell 20 and the sleep deck 12. Additionally or alternatively, the clasping portion 78 may fit within one of the notches 46 defined by the sleep deck 12 to at least partially couple the retention feature 72, and the mattress 18, to the sleep deck 12. The retention feature 72 may be, by way of example not limitation, a rigid polymeric material, such as plastic, or a flexible yet rigid metal, such as steel, and may include any one of an arcuate, triangular, rectangular, etc. geometries as the clasping portion 78. As described below, the retention feature 72 is flexibly adjusted to manipulate the retention feature 72 around the sleep deck 12, such that the planar portion 75 extends along the support surface 40.

The planar portion 75 of the retention feature 72 is fixedly coupled to the mattress 18 by a fastener portion 80, which is disposed within the outer mattress shell 20. Coupling members 82 extend through outer mattress shell 20 and the fastener portion 80 to securely couple to the retention feature 72 to the outer mattress shell 20. The coupling members 82 may be, by way of example not limitation, bolts which are secured with nuts in the outer mattress shell 20. The coupling members 82 extend through the planar portion 75 of the retention feature 72, which includes a contact plate 84 disposed between the coupling members 82 and the sleep deck 12. The contact plate 84 provides a buffer between the coupling members 82 and the sleep deck 12 to minimize abrasive contact on the sleep deck 12 by the coupling members 82. The retention feature 72 allows the caregiver to secure the mattress 18 on the sleep deck 12 while also being able to selectively uncouple the retention feature 72 and the mattress 18 from the sleep deck 12 to provide access to the bottom surface 49 of the mattress 18 for repair and/or cleaning while the retention feature 72 remains coupled to the sleep deck 12.

With further reference to FIGS. 2A-2C, the raised portion 74 is integrally formed with the planar portion 75 and the clasping portion 78 to define the recessed portion 76. Additionally or alternatively, the raised portion 74 and the planar portion 75 can be individual pieces that are then coupled to one another, along with the clasping portion 78 to define the recessed portion 76. The recessed portion 76 generally allows the retention feature 72 to be flexible, such that the raised portion 74 can bend to create an increased separation between the planar portion 75 and the clasping portion 78. Stated differently, the size of the recessed portion 76 that is defined between the raised portion 74 and the planar portion 75 increases so that the retention feature 72 can clamp onto the sleep deck 12. The raised portion 74 and the planar portion 75 are coupled at a flex corner 86 of the retention feature 72, such that there is a high degree of flexion at the flex corner 86. This flexion allows the fit of the retention feature 72 on the sleep deck 12 to be tight, as the retention feature 72 can be bent and manipulated at the flex corner 86 to fit the retention feature 72 on the edge of the sleep deck 12. A plurality of ridges 88 may provide additional structural support for the retention feature 72 around the flex corner 86. The plurality of ridges 88 strengthen the retention feature 72 around the flex corner 86 to minimize the effects of repeated flexing of the retention feature 72 around the sleep deck 12. The raised portion 74 may provide additional leverage for a user when bending the retention feature 72 at the flex corner 86 before connection to the sleep deck 12.

Figure 3A:
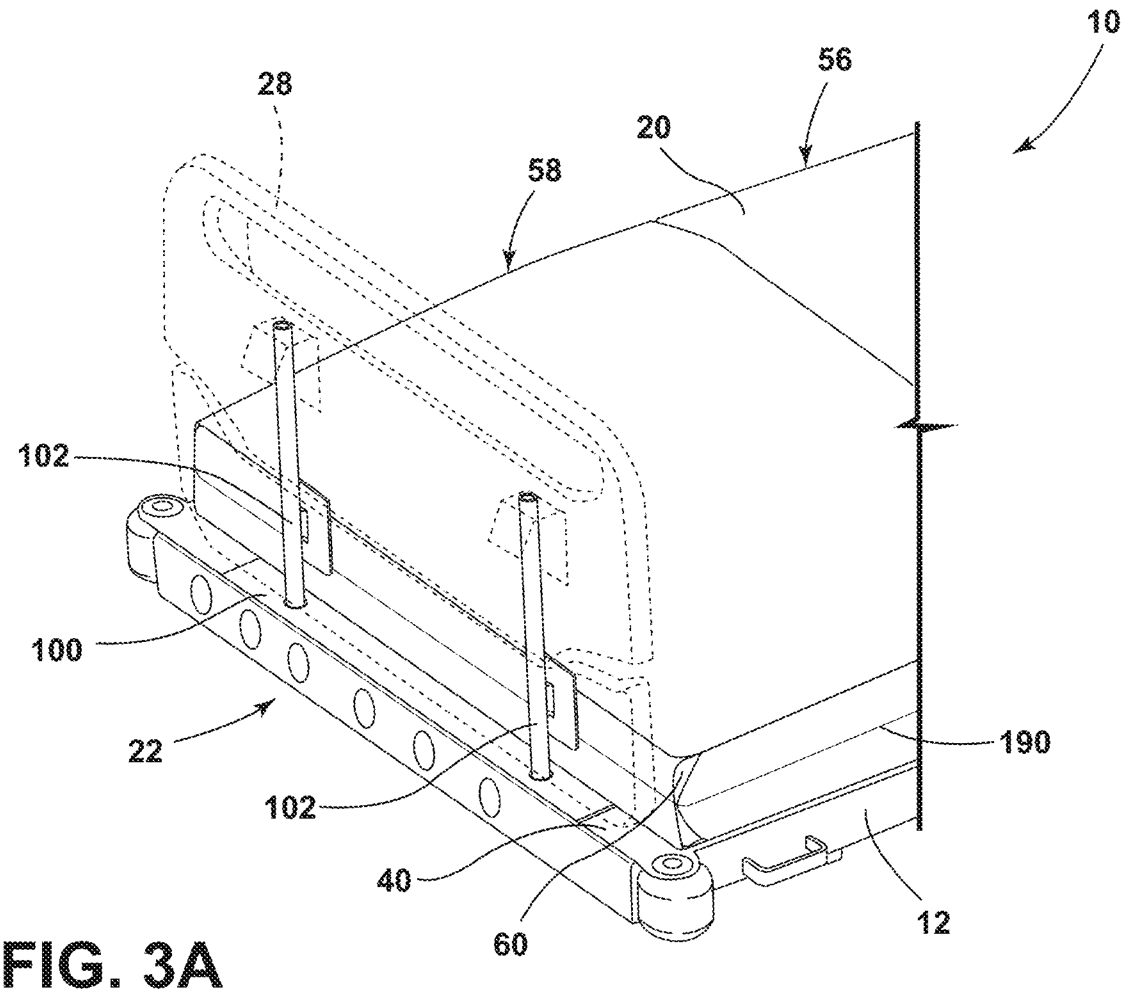
FIG. 3A is a partial top perspective view of a footboard of a hospital bed and mattress retention assembly of the present disclosure.
Figure 3B:
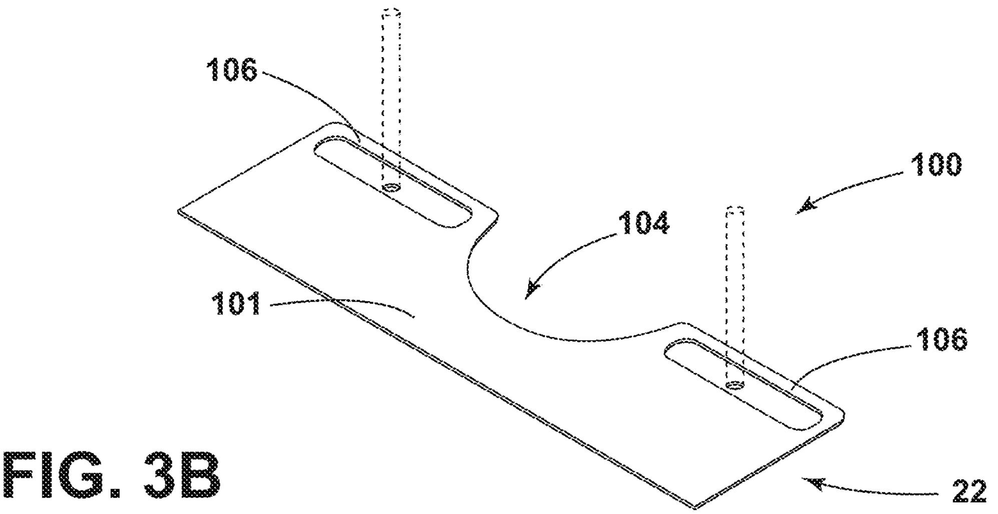
FIG. 3B is a top perspective view of a locking flap used to secure a mattress to a footboard and a sleep deck of a hospital bed of the present disclosure.

With reference now to FIGS. 3A and 3B, in another aspect of the present disclosure, the mattress retention assembly 22 includes a locking flap 100 coupled to the outer mattress shell 20 via a flat portion 101 of the locking flap 100. The flat portion 101 of the locking flap 100 extends between the outer mattress shell 20 and the sleep deck 12 to couple the outer mattress shell 20 to the sleep deck 12. The locking flap 100 may also be coupled to a post 102 of the footboard 28 ultimately coupling the mattress 18 to the sleep deck 12. It is also contemplated that the footboard 28 may include multiple posts 102 to which the locking flap 100 may be coupled. The locking flap 100 includes a cutout portion 104 defined by at least one securing member 106 that may allow the locking flap 100 to be used with sleep decks that have projections or obstructions. As illustrated in FIG. 3B, the cutout portion 104 is arcuate in shape and is defined by two securing members 106 coupled to the posts 102 of the footboard 28, such that each of the posts 102 may be received within each of the securing members 106, respectively. Thus, the locking flap 100 is configured to couple the mattress 18 with the sleep deck 12 via the posts 102 of the footboard 28, such that upon repositioning of the hospital bed 10, the locking flap 100 may resist potential sliding movement of the mattress 18.

It will be understood by one having ordinary skill in the art that a variety of different materials may be used to construct the locking flap 100. The locking flap 100 may extend the width of the sleep deck 12. Alternatively, the locking flap 100 may extend across only a portion of the width of the sleep deck 12 while still preventing the mattress 18 from significantly repositioning relative to the sleep deck 12. It is generally contemplated that the locking flap 100 may be directly coupled to the mattress 18 and/or the outer mattress shell 20. As stated above, attaching the locking flap 100 to either the mattress 18 or the outer mattress shell 20 allows the caregiver to minimize the shifting of the mattress 18 relative to the sleep deck 12.

Figure 4A:
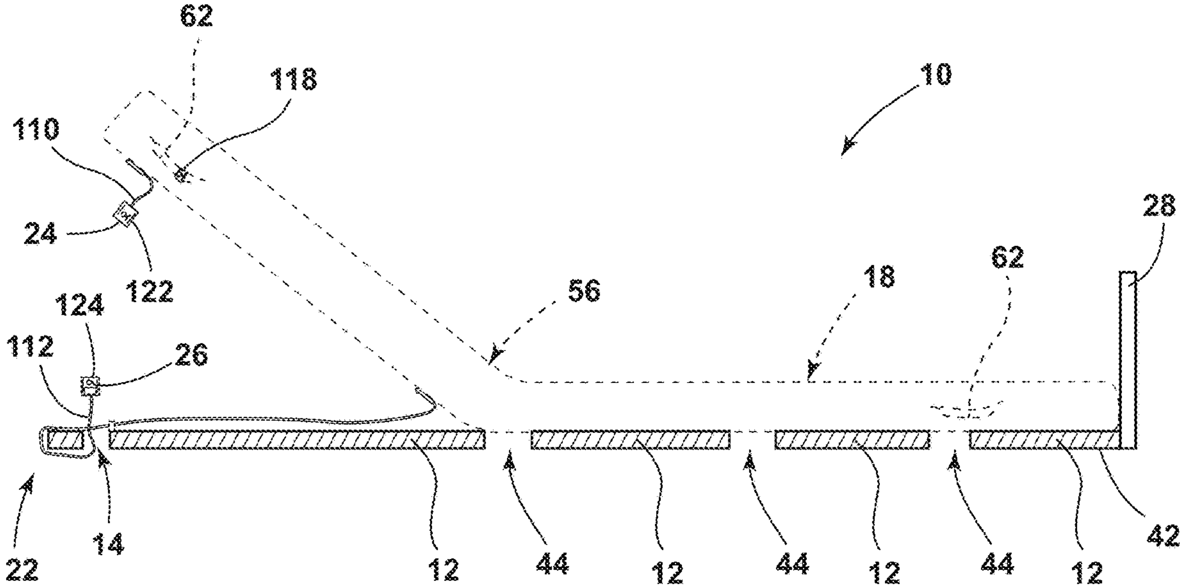
FIG. 4A is a side elevational view of a hospital bed and a first and second strap of a mattress retention assembly of the present disclosure.
Figure 4B:
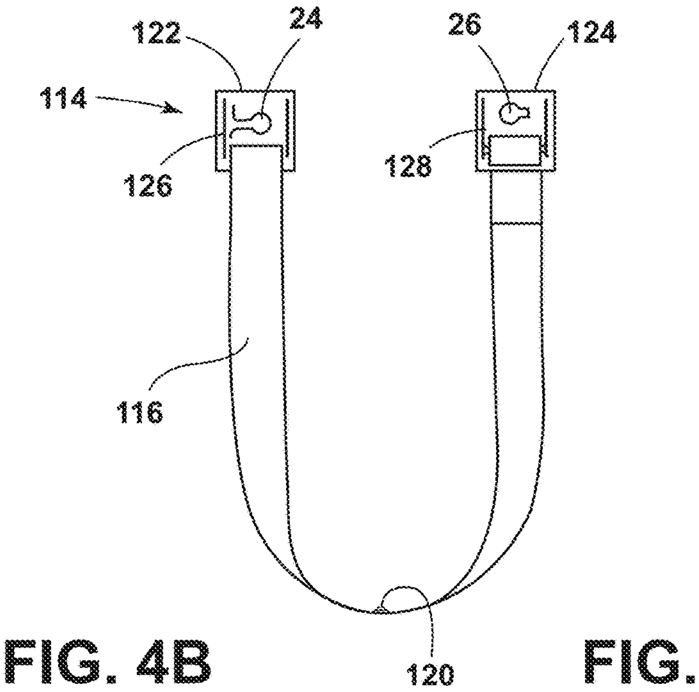
FIG. 4B is a front elevational view of a loop strap of a mattress retention assembly of the present disclosure.
Figure 4C:
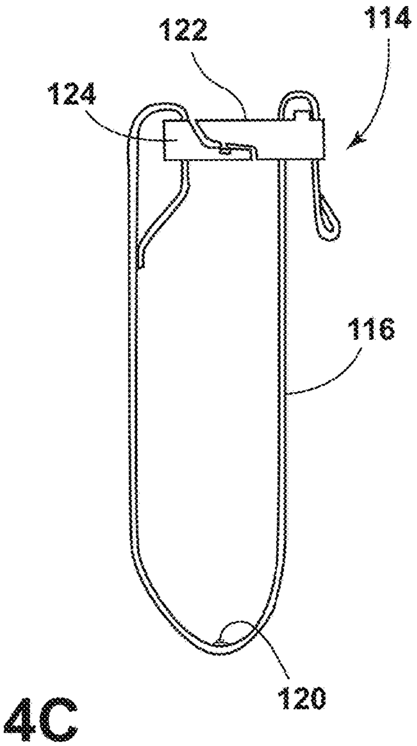
FIG. 4C is a side elevational view of a loop strap of a mattress retention assembly of the present disclosure.

With reference now to FIGS. 4A-4C, the mattress retention assembly 22 includes a first strap 110 and a second strap 112. Additionally or alternatively, the mattress retention assembly 22 may include a loop strap 114 that has a single strap 116 configured to couple to an attachment portion 118 of the handle 62. The mattress retention assembly 22 illustrated in FIGS. 4A-4C includes a first clasp portion 122 and a second clasp portion 124, which have a first groove 126 and a second groove 128, respectively, described below. As illustrated in FIG. 4A, the first strap 110 is coupled to the head portion 54 of the mattress 18. In addition, the second strap 112 may be coupled to the medial portion 56 of the mattress 18, as well as coupled to the sleep deck 12 through the opening 14 defined by the sleep deck 12. The first strap 110 and the second strap 112 are configured to selectively couple to each other and retain the mattress 18 on the sleep deck 12. As depicted in FIG. 4A, the second strap 112 is coupled to the sleep deck 12 by looping the second strap 112 through the opening 14 defined by the sleep deck 12, such that the second strap 112 encircles a portion of the sleep deck 12. Additionally or alternatively, the second strap 112 may be coupled to the sleep deck 12 by directly fastening the second strap 112 to the sleep deck 12. The second strap 112 may be adhered, fastened, welded, or otherwise coupled to the sleep deck 12 via known detachment methods. The caregiver may detach the first strap 110 from the second strap 112 when cleaning the sleep deck 12 or removing the outer mattress shell 20 of the mattress 18.

Figure 1B:
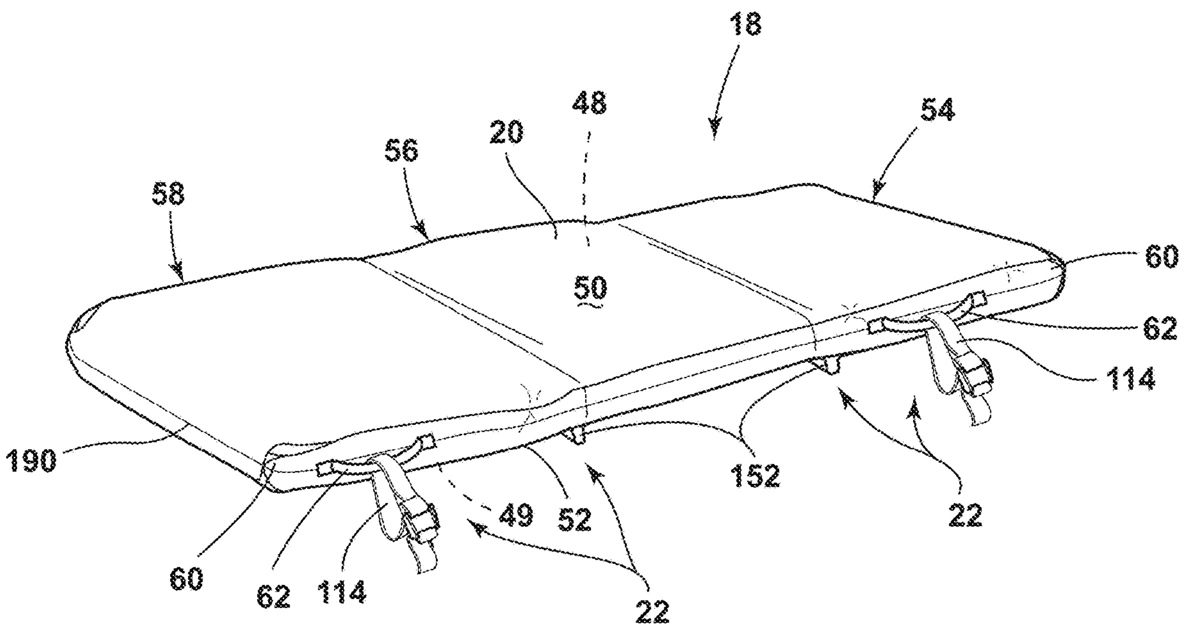
FIG. 1B is a top perspective view of a mattress of the present disclosure.

As shown in FIGS. 4B and 4C, the mattress retention assembly 22 may include the loop strap 114, which includes a single strap 116 configured to pass through the opening 14 defined by the sleep deck 12 such that the loop strap 114 encircles at least a portion of the sleep deck 12. Additionally, as depicted in FIGS. 1A and 1B, the loop strap 114 may couple to the mattress 18 through the handle 62 on the outer mattress shell 20. In this instance, the caregiver may couple the loop strap 114 to the mattress 18 by attaching a restraint 120 on the loop strap 114 to the attachment portion 118 on the handle 62. The loop strap 114 may be coupled to the handle 62 at an attachment portion 118 by, for example, a snap or other fastener known in the art. In either construction, the caregiver may then tighten the loop strap 114 to secure the mattress 18 to the sleep deck 12.

The first groove 126 and the second groove 128, mentioned above, are configured to slidably couple the first and second clasp portions 122, 124, respectively. The first and second grooves 126, 128 assist the caregiver in facilitating the coupling of the first and second clasp portions 122, 124 to secure the mattress 18 to the sleep deck 12. Moreover, it is contemplated that the first and second magnets 24, 26 of the mattress retention assembly 22 may be disposed upon the first and second clasp portions 122, 124, respectively. For example, as shown in FIG. 4B, the first magnet 24 is disposed on the first clasp portion 122 and the second magnet 26 is disposed on the second clasp portion 124, wherein the first magnet 24 includes a polarity opposite that of the complementary second magnet 26 of the mattress retention assembly 22. Stated differently, the first strap 110 is operably coupled with the first magnet 24 and the second strap 112 is operably coupled with the second magnet 26, such that the second magnet 26 of the second strap 112 is selectively coupled with the first magnet 24 of the first strap 110. The first and second magnets 24, 26 may further assist the caregiver in securing the mattress 18 with the sleep deck 12 using the mattress retention assembly 22, while also allowing the caregiver to more easily uncouple the first and second clasp portions 122, 124. To secure the mattress 18, the caregiver can tighten the loop strap 114 and/or the first and second straps 110, 112 to ensure the mattress 18 remains stabilized during articulation of the sleep deck 12.

Figure 5A:
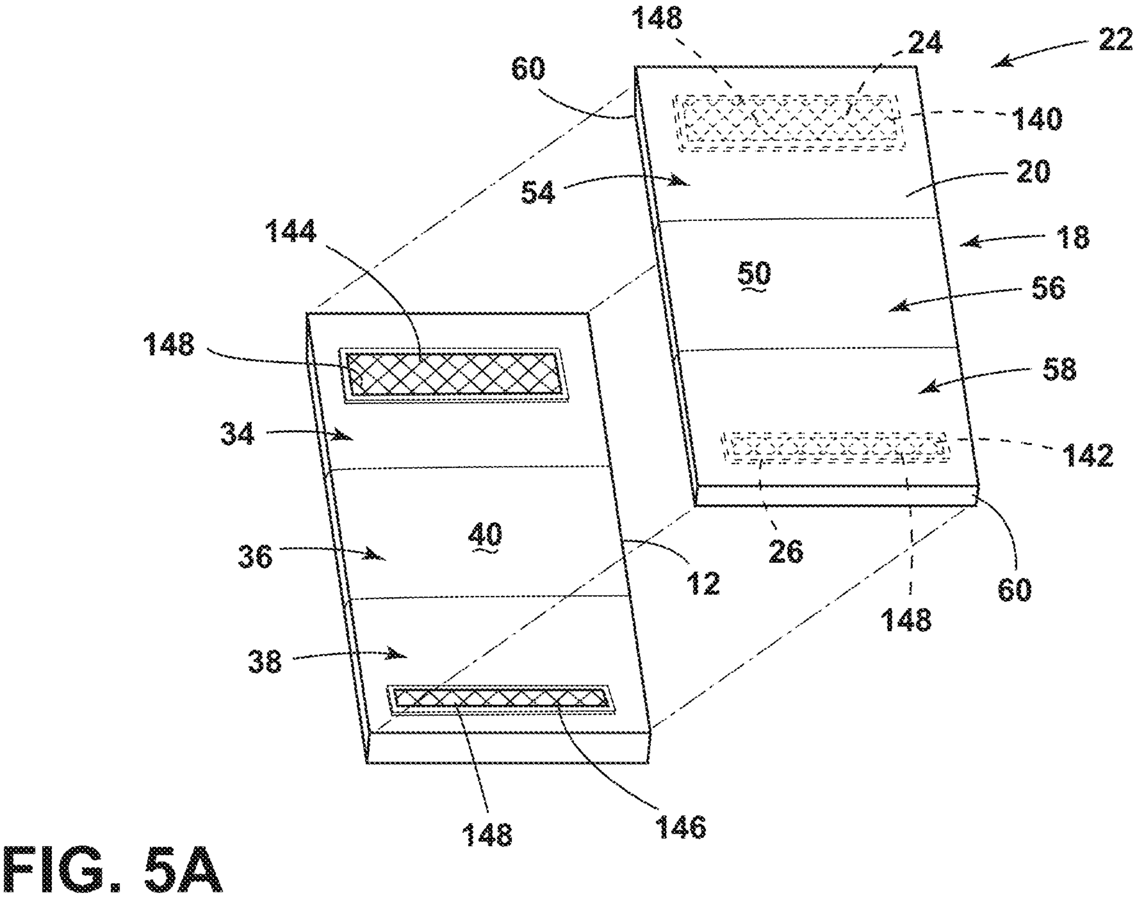
FIG. 5A is a top perspective exploded view of top and bottom mattress magnets and upper and lower magnetic portions of a mattress retention assembly of the present disclosure.

With reference now to FIG. 5A, in yet another aspect of the present disclosure, it is contemplated that the first magnet 24 is disposed on the head portion 54 of the outer mattress shell 20 and the second magnet 26 is disposed on the foot portion 58 of the outer mattress shell 20. The first and second magnets 24, 26 of the mattress retention assembly 22 can correspond to a top mattress magnet 140 and a bottom mattress magnet 142, respectively. It is generally contemplated that the top mattress magnet 140 and the bottom mattress magnet 142 are embedded in the mattress 18, such that the outer mattress shell 20 conceals the top mattress magnet 140 and the bottom mattress magnet 142. Alternatively, the top and the bottom mattress magnets 140, 142 may be operably coupled with the exterior surface 52 of the outer mattress shell 20, such that the top mattress magnet 140 and the bottom mattress magnet 142 are exposed to the sleep deck 12. An upper magnetic portion 144 and a lower magnetic portion 146 of the sleep deck 12, are configured to couple the mattress 18 to the sleep deck 12 via the top mattress magnet 140 and bottom mattress magnet 142, respectively. It is generally contemplated that the top mattress magnet 140 and bottom mattress magnet 142 include a polarity opposite that of the complementary upper magnetic portion 144 and lower magnetic portion 146, respectively.

With reference again to FIG. 5A, when the top and the bottom mattress magnets 140, 142 are disposed on the exterior surface 52 of the outer mattress shell 20, the top and bottom mattress magnets 140, 142 are coated with a layer of material 148 having a coefficient of friction exceeding at least 0.3μ to facilitate the shear resistance between the top and the bottom mattress magnets 140, 142 and the upper and lower magnetic portions 144, 146 during repositioning of the hospital bed 10. It is also contemplated that the coefficient of friction may be as low as 0.1μ. In addition, the upper and lower magnetic portions 144, 146, as illustrated, include the material 148 to frictionally, as well as magnetically, engage the top and bottom mattress magnets 140, 142, respectively. Accordingly, the layer of material 148 may assist the overall retention of the mattress 18 by keeping the mattress magnets 140, 142 in line with the magnetic portions 144, 146. Stated differently, the coupling force between the upper and the lower magnetic portions 144, 146 and the top and the bottom mattress magnets 140, 142 remains stable during various articulations of the sleep deck 12 and the mattress 18 as a result of both the magnet force and the frictional force. The top mattress magnet 140 and the bottom mattress magnet 142 may be coupled to the outer mattress shell 20, such that each mattress magnet 140, 142 can be adhered, fastened, and/or embedded within the outer mattress shell 20. Similarly, the upper and lower magnetic portions 144, 146 can be adhered, fastened, and/or embedded within the sleep deck 12. The secure attachment of each of the mattress magnets 140, 142 and the magnetic portions 144, 146 defines the secure attachment and coupling of the mattress 18 with the sleep deck 12.

Figure 5B:
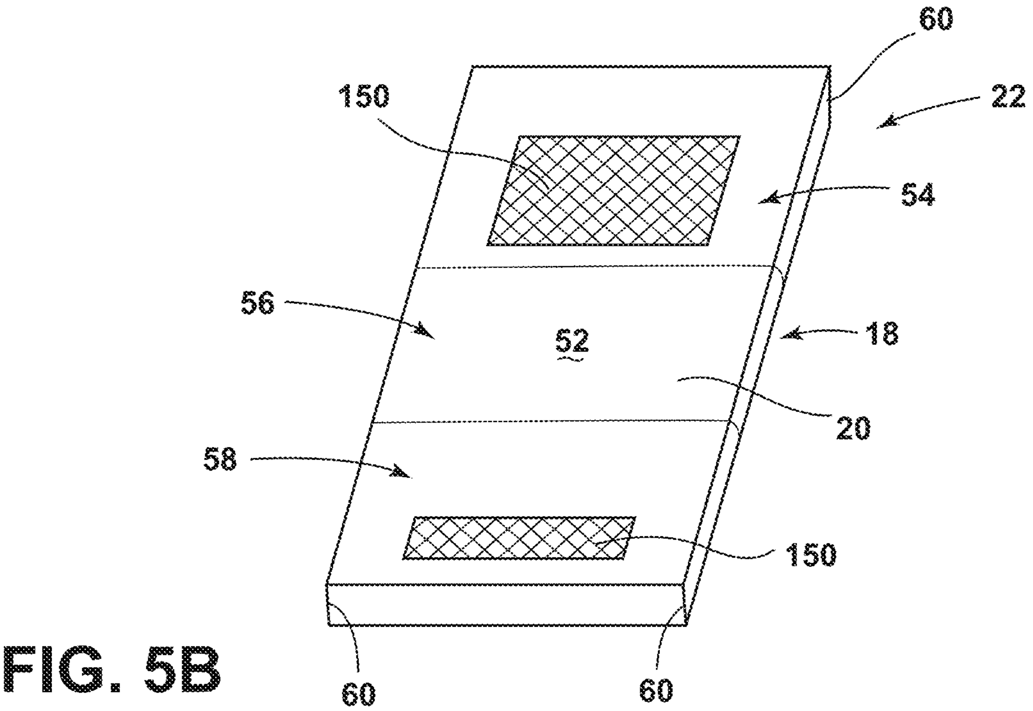
FIG. 5B is a bottom perspective view of an affixing member of a mattress retention assembly of the present disclosure.

As shown in FIG. 5B, the mattress retention assembly 22 may include an affixing member 150 coupled to the outer mattress shell 20. The affixing member 150 has a generally high coefficient of friction to minimizes significant movement of the mattress 18 in relation to the sleep deck 12. The coefficient of friction of the affixing member 150 is generally contemplated to exceed at least 0.3μ in order to securely grip the mattress 18 to the sleep deck 12. It is also contemplated that the coefficient of friction may be as low as 0.1μ. Thus, the caregiver can adjust the hospital bed 10 while maintaining the selected position of the mattress 18. The affixing member 150, as depicted, is located at the head portion 54 and the foot portion 58 of the mattress 18. However, the affixing member 150 may also be located at the medial portion 56 of the mattress 18 independently of, or in combination with, the other portions of the mattress 18. Alternatively, it will be understood that there may be multiple affixing members 150 each located at the head portion 54, the medial portion 56, and/or the foot portion 58 of the mattress 18. Additionally, the affixing member 150 may span the entire width and height of the bottom surface 49 of the mattress 18. Alternatively, the affixing member 150 may span a width sufficient to retain the mattress 18 in the desired position. In either configuration, the caregiver can reposition the hospital bed 10 and the mattress 18 will simultaneously reposition while remaining with the sleep deck 12.

In such an embodiment, the weight of the user may further assist in the coupling between the affixing member 150 and the sleep deck 12 through pressure forces. The coefficient of friction, although sufficient independently, may be enhanced by pressure forces exerted by the weight of the user on the mattress 18. Accordingly, the caregiver may adjust the mattress 18 and the sleep deck 12 of the hospital bed 10 while the hospital bed 10 is in use and the affixing member 150 will minimize significant movement of the mattress 18 relative to the sleep deck 12.

With reference now to FIGS. 6A-6D, the mattress retention assembly 22 may also include a retention ridge 152 that may be coupled to the mattress 18. It is generally contemplated that the retention ridge 152 can be coupled to the interior surface 50 of the outer mattress shell 20 and be covered by the outer mattress shell 20. Alternatively, the retention ridge 152 may be coupled to the exterior surface 52 of the outer mattress shell 20. It is also contemplated that at least one retention ridge 152 may be used; however, the use of more than one retention ridge 152 is further contemplated. The retention ridge 152 is configured to fit within at least one of the spaces 44 defined by the sleep deck 12. For example, the retention ridge 152 may be received in the space 44 defined between the upper portion 34 and the middle portion 36 of the sleep deck 12. Additionally or alternatively, the retention ridge 152 may be received in the space 44 defined between the middle portion 36 and the lower portion 38 of the sleep deck 12. The depicted interlocking configuration of the retention ridge 152 within one of the spaces 44 allows the caregiver to reposition the hospital bed 10, while the retention ridge 152 minimizes the likelihood that the mattress 18 will downwardly and/or upwardly shift along the sleep deck 12. When multiple retention ridges 152 are used, each retention ridge 152 abuts the sleep deck 12 to prevent significant movement of the mattress 18. The retention ridge 152 may extend at least partially along the width of the sleep deck 12 and the mattress 18. Additionally or alternatively, the retention ridge 152 may extend the entire width of the sleep deck 12 and the mattress 18. In either aspect, the retention ridge 152 interfaces with the sleep deck 12 such that when a caregiver adjusts the position of the sleep deck 12 and the mattress 18, the mattress 18 moves with the sleep deck 12 to the caregiver selected position.

Figure 6A:
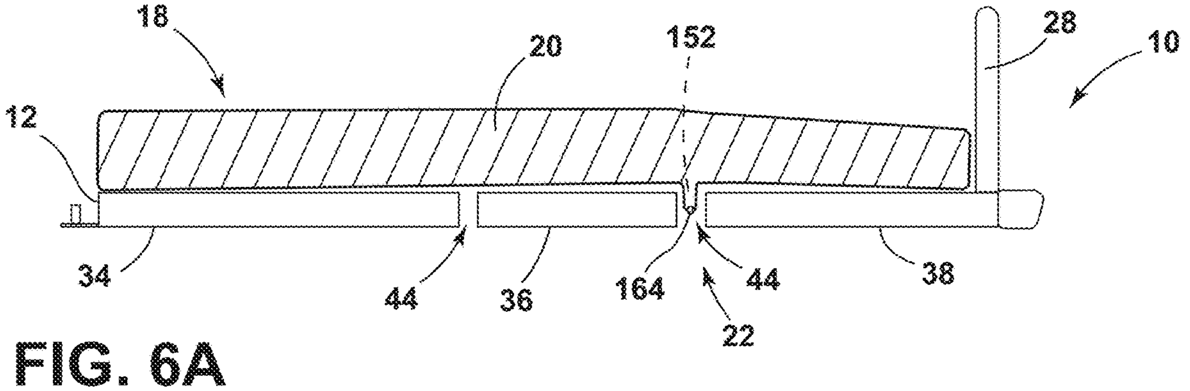
FIG. 6A is a side elevational view of a hospital bed and a retention ridge of a mattress retention assembly of the present disclosure.
Figure 6B:
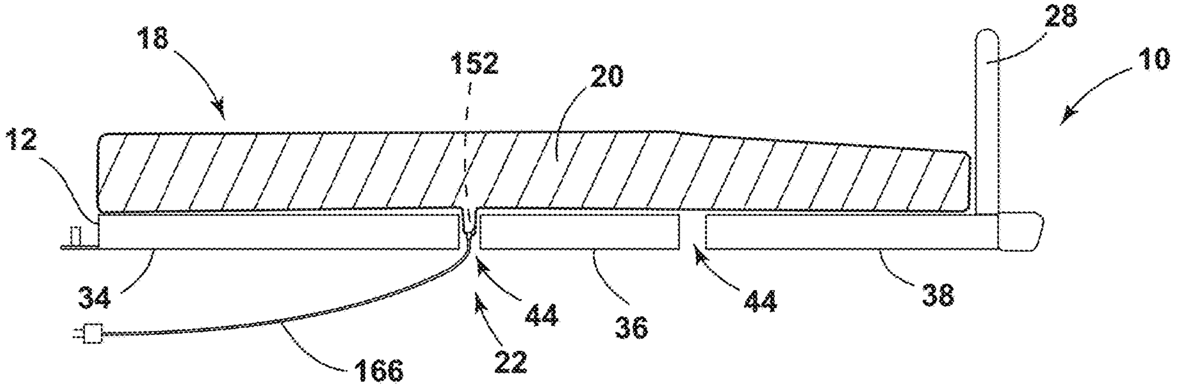
FIG. 6B is a side elevational view of a hospital bed and a retention ridge of the mattress retention assembly of the present disclosure.
Figure 6C:
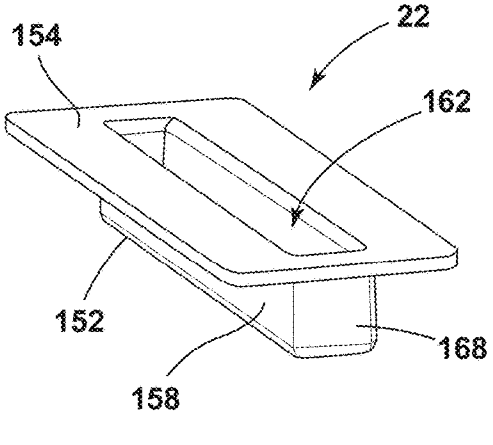
FIG. 6C is a top perspective view of a retention ridge of the present disclosure.
Figure 6D:
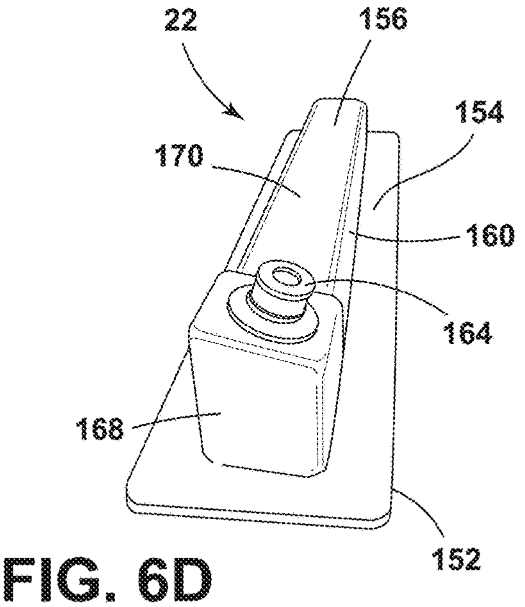
FIG. 6D is a bottom perspective view of a retention ridge of the present disclosure.

As depicted in FIGS. 6C and 6D, the retention ridge 152 includes a flange 154 and a projection 156 that has a first surface 158 and a second surface 160. Additionally, as shown, a cavity 162 is defined by the projection 156, discussed further below. The retention ridge 152 may be generally rigid or solid, and the projection 156, as shown, is generally rectangular. It will also be understood, however, that the projection 156 may take on a variety of other geometric constructions. The rectangular shape of the projection 156 may result in the first and second surfaces 158, 160 having larger contact surface areas with the sleep deck 12 when compared with alternative shapes of the projection 156. The larger contact surface areas of the first and second surfaces 158, 160 provide a greater surface of engagement with the sleep deck 12.

A port 164 is defined by the projection 156 and provides access to cavity 162. The port 164 is configured to receive a cord 166 (FIG. 6B), which may be at least one of a power cord or a data cord from the mattress 18. The cord 166 (FIG. 6B) can be disposed within the cavity 162 to generally conceal the cord 166 while retaining any potential excess slack of the cord 166 (FIG. 6B), which may be extracted when the mattress 18 is repositioned. The port 164 may be located at lateral portions 168 of the retention ridge 152. Alternatively, the port 164 may be located at any other suitable portion of the retention ridge 152, for example, at a midway portion 170. The positioning of the port 164 may depend upon where the cord 166 is positioned relative to the mattress 18. However, it is generally contemplated that the cord 166 may be any cord that may extend outward from the mattress 18 through the port 164 of the retention ridge 152. By including the port 164, the caregiver may easily access the cord 166 of the mattress 18 for patient care or hospital policy. Accordingly, the caregiver can adjust the hospital bed 10 while maintaining access to the cord 166 and minimizing shifting of the mattress 18 relative to the sleep deck 12. It is generally contemplated that the mattress retention assembly 22 may include any combination of the retention features described herein, as well as any other mattress retention assembly options as known in the art.

Figure 7A:
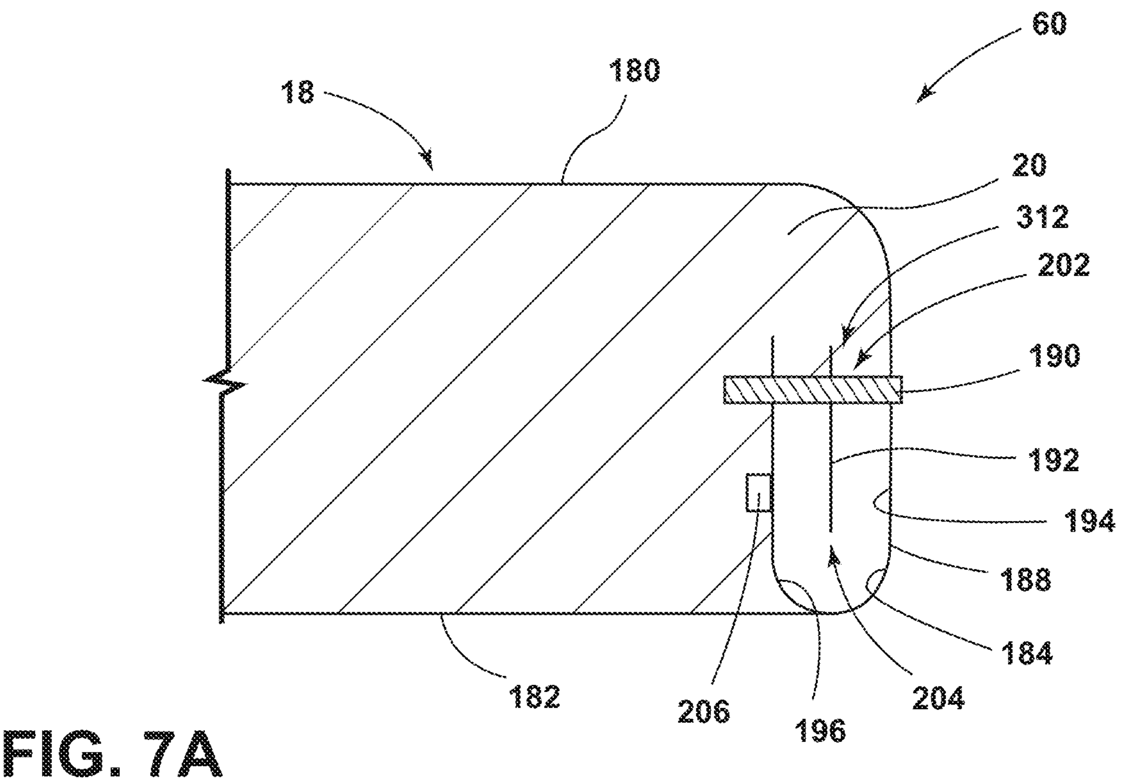
FIG. 7A is a schematic view of a bonding strip, an outer mattress shell, and a side flap of a mattress of the present disclosure.
Figure 7B:
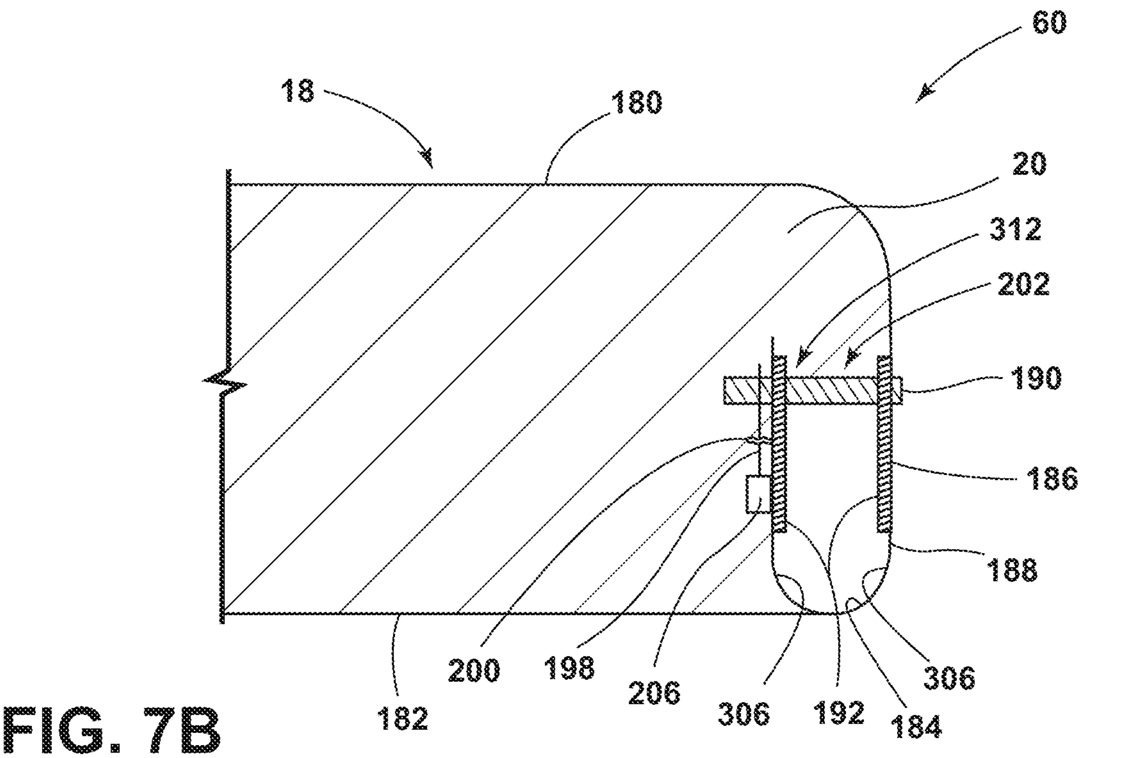
FIG. 7B is a schematic view of multiple bonding strips, an outer mattress shell, and a side flap of a mattress of the present disclosure.

Referring now to FIGS. 7A and 7B, the outer mattress shell 20 includes the interior surface 50 and the exterior surface 52. The exterior surface 52 generally defines a patient support portion 180 and a sleep deck portion 182. The mattress retention assembly 22 (FIGS. 1A-6B) described above may be coupled to or disposed on the sleep deck portion 182 in any one of the configurations described above. It is generally contemplated that the interior surface 50 of the outer mattress shell 20 may be a non-coated fabric while the exterior surface 52 of the outer mattress shell 20 is a coated fabric such as, for example, a polyurethane-based fabric. The use of coated fabric on the exterior surface 52 allows the caregiver to easily sterilize the mattress 18 between users. Additionally, the outer mattress shell 20 may include a fold 188 that may be constructed from excess portions of the outer mattress shell 20. The fold 188 covers the access points of the outer mattress shell 20 through which the caregiver can access the mattress 18 disposed within the outer mattress shell 20. By way of example, not limitation, the access points may be the location at which the patient support portion 180 is coupled to the sleep deck portion 182 of the outer mattress shell 20.

The fold 188 allows a caregiver to maintain cleanliness standards between users by directing user-fluids and other liquids past portions of the outer mattress shell 20 configured to provide the caregiver access to the mattress 18. In one aspect of the present disclosure, the outer mattress shell 20 and the fold 188 may be sealed with a weld 190, which couples a bonding strip 192 to a first section 194 and/or a second section 196 of the interior surface 50 of the outer mattress shell 20. Further, the weld 190 can couple a fastening strip 198 to the exterior surface 52 of the outer mattress shell 20 and the fold 188. A stitch 200 can further couple the fastening strip 198 to the outer mattress shell 20 and the fold 188, wherein the stitch 200 (FIG. 7B) may be any securing member known in the art. Additionally, the weld 190 may maintain the fold 188 of the outer mattress shell 20 in its folded state.

It is generally contemplated that the weld 190 may be a radiofrequency weld. The radiofrequency weld allows for a more secure and sterile seal between the patient support portion 180 and the sleep deck portion 182 of the outer mattress shell 20, such that liquids may be prevented from penetrating the outer mattress shell 20. As such, the use of the radiofrequency weld may allow a caregiver to readily clean the outer mattress shell 20 between users with minimal risk of residual contamination possibly entering the mattress 18 through the weld 190. The radiofrequency weld is incorporated by applying electromagnetic energy and pressure to the outer mattress shell 20 and the bonding strip 192 to form the weld 190. The weld 190 can be formed, for example, in a shear configuration 202 (FIG. 7A). The formatting of the weld 190 in the shear configuration 202 further allows the weld 190 to generally withstand more force during use, for example, a pulling force by the caregiver during cleaning, as it is generally perpendicular relative to the outer mattress shell 20. Consequently, the weld 190 will be stronger if the shear configuration 202 were to be used.

Figure 9A:
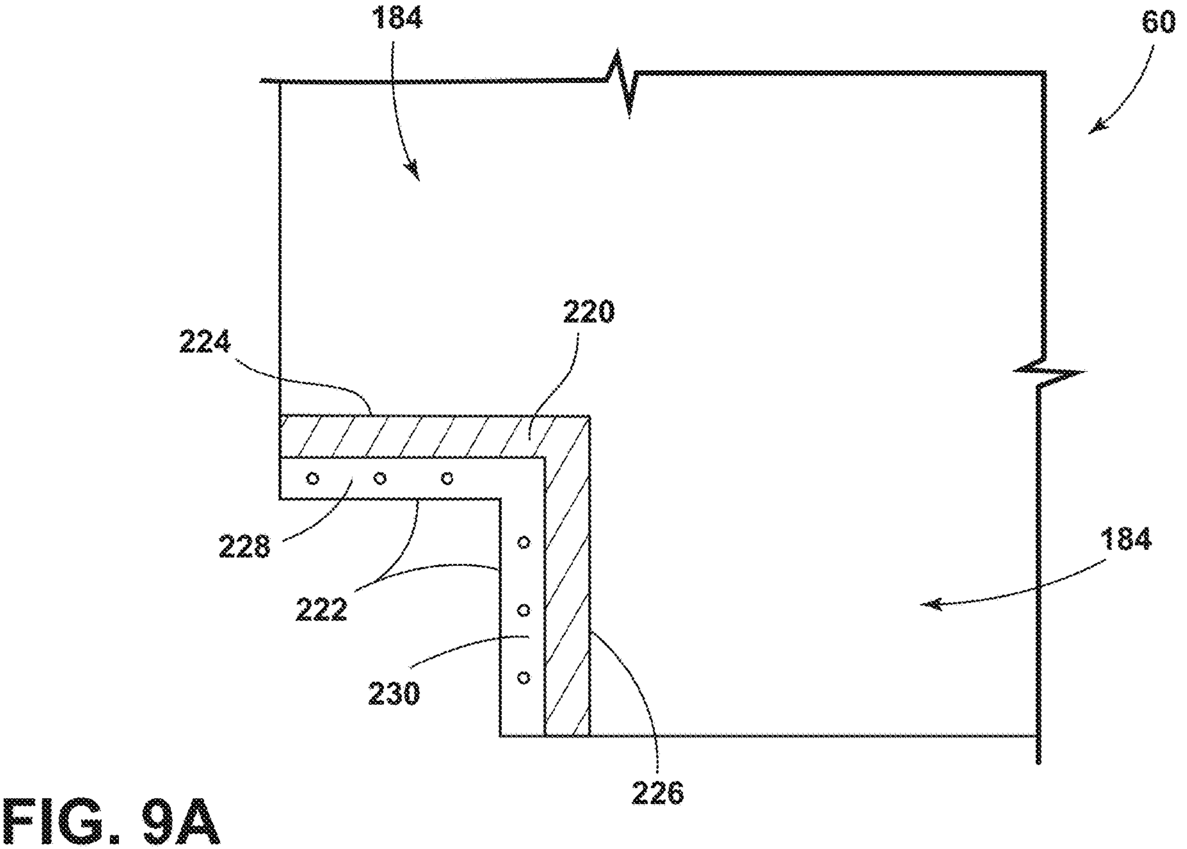
FIG. 9A is a schematic view of interior portions of a corner portion of an outer mattress shell of a mattress of the present disclosure.
Figure 9B:
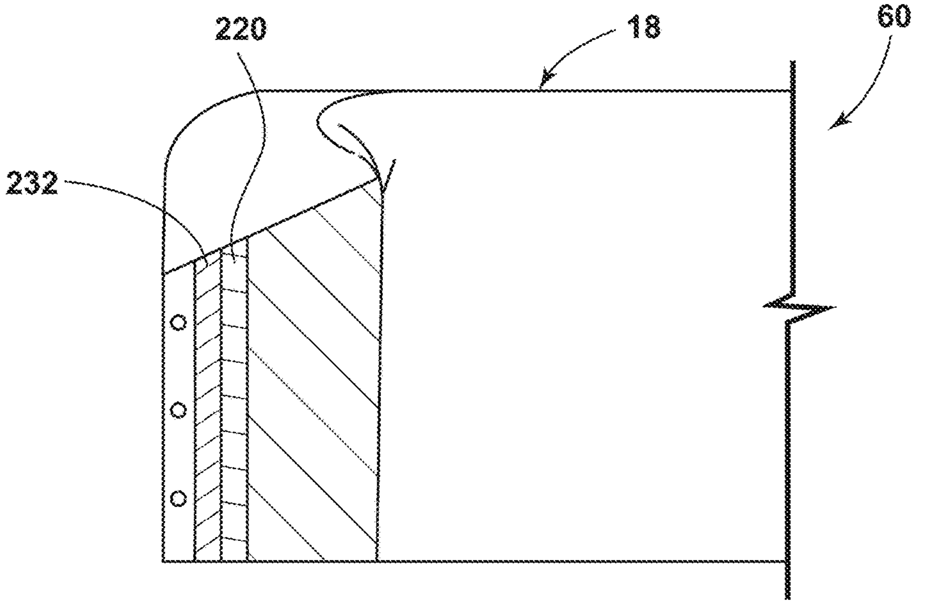
FIG. 9B is a schematic view of a corner portion of an outer mattress shell and weld of a mattress of the present disclosure.

In addition, the bonding strip 192 can be used to strengthen the weld 190 as the bonding strip 192 is configured to stabilize the fold 188 under strong pulling forces that may occur during use. Further, the use of more than one bonding strip 192 results in a stronger weld hold. When the multiple bonding strips 192 are used, the multiple bonding strips 192 may at least partially overlap, such that the bonding strips 192 are at least partially coupled together, as illustrated and discussed below with reference to FIGS. 9A and 9B. Alternatively, the multiple bonding strips 192 may entirely overlap such that the bonding strips 192 are entirely coupled together (FIGS. 9A and 9B). As illustrated in FIG. 7B, the multiple bonding strips 192 are coupled to the first section 194 and the second section 196 of the interior surface 50 proximate the fold 188 of the outer mattress shell 20. Alternatively, the bonding strip 192 can be positioned in a central position 204 within the fold 188 of the outer mattress shell 20. Due to the increased bonding strength, the caregiver may more rigorously clean the outer mattress shell 20 where the bonding strips 192 are used to strengthen the weld 190.

Additionally in one of the depicted aspects, the fastening strip 198 couples a clasp locker 206 (commonly referred to as a zipper) to the exterior surface 52 of the outer mattress shell 20. The clasp locker 206 can be coupled directly to the outer mattress shell 20 and the fold 188 such that the mattress 18 does not include the fastening strip 198, as depicted in FIGS. 7A and 7B. In such disclosures, the clasp locker 206 may be a weldable zipper and coupled to the exterior surface 52 of the outer mattress shell 20 using a radiofrequency weld. When the clasp locker 206 couples directly to the exterior surface 52 of the outer mattress shell 20, the caregiver may again be more rigorous in cleaning and removing the outer mattress shell 20 due to the strength of the coupling. It will be understood by one having ordinary skill in the art that a variety of different clasp lockers 206 may be available for direct coupling to the outer mattress shell 20 and the fold 188. In either depiction, the clasp locker 206 allows the caregiver to remove the outer mattress shell 20 to thoroughly sterilize the outer mattress shell 20 between users.

Figure 8A:
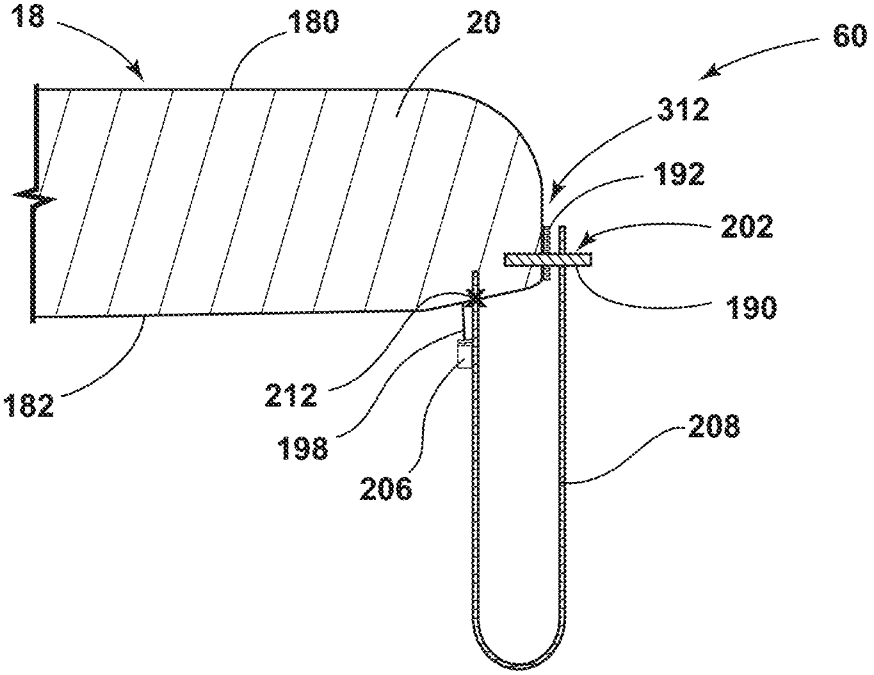
FIG. 8A is a schematic view of a weld in a shear configuration, a flap, a bonding strip, and an outer mattress shell of a mattress of the present disclosure.
Figure 8B:
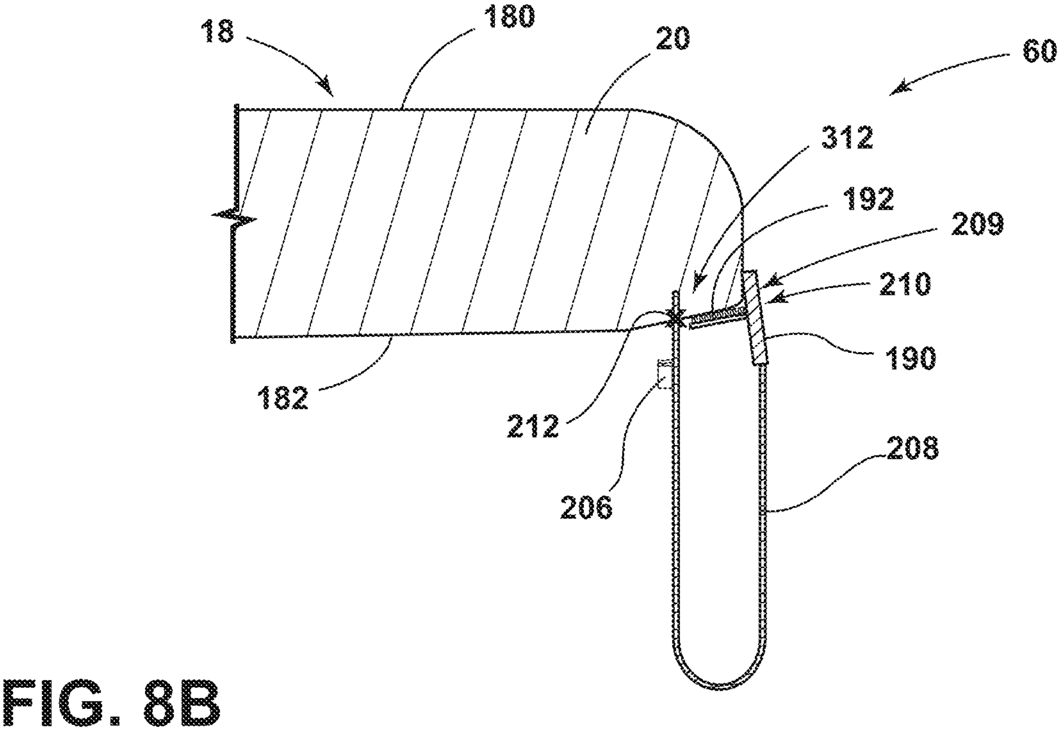
FIG. 8B is a schematic view of a weld in a peel configuration, a flap, a bonding strip, and an outer mattress shell of a mattress of the present disclosure.

With reference now to FIGS. 8A and 8B, the mattress 18 can further include a flap 208 coupled to the outer mattress shell 20 via the weld 190. The addition of the flap 208 may provide similar advantages to those of the fold 188, such as allowing a caregiver to maintain cleanliness between users of the hospital bed 10 while covering potential access points to the mattress 18 within the outer mattress shell 20. It is generally contemplated that the flap 208 may be of a length longer than that of the fold 188 providing greater distance for liquids to travel away from the patient support portion 180 of the outer mattress shell 20. When the weld 190 is applied in the shear configuration 202, described above, the flap 208 may be coupled directly to the exterior surface 52 of the outer mattress shell 20 without the use of the bonding strip 192. However, it is also contemplated that the bonding strip 192 may be used when using the weld 190 in shear configuration 202 to strengthen the bond when the flap 208 is coupled to the exterior surface 52 of the outer mattress shell 20. The bonding strip 192 may be disposed between the flap 208 and the exterior surface 52 of the outer mattress shell 20. The use of the shear configuration 202 may allow a caregiver to clean the outer mattress shell 20 with a minimized risk of the weld 190 pulling apart due to the strength of the shear configuration 202. As previously noted, when the weld 190 is in the shear configuration 202 it may withstand more force than the weld 190 in a peel configuration 209.

As shown in FIG. 8B, in an alternate depiction, the weld 190 may be in a peel configuration 209 having a generally horizontal overlap of the flap 208 and a vertical weld 210. The peel configuration 209 may include the vertical weld 210 to couple the bonding strip 192 and the flap 208 to the sleep deck portion 182 of the outer mattress shell 20. In this alternate depiction, it is generally contemplated that multiple bonding strips 192 may be coupled to the sleep deck portion 182 of the outer mattress shell 20 and the flap 208. The addition of multiple bonding strips 192 strengthens the bond of the flap 208 with the outer mattress shell 20 in the peel configuration 209. In addition, it is generally contemplated that when using the flap 208, the fastening strip 198 may be coupled to the sleep deck portion 182 of the outer mattress shell 20 by the stitch 200. The flap 208 may be additionally coupled to the outer mattress shell 20 by a fastening member 212, which provides additional strength to the flap 208 such that the caregiver may apply more force while adjusting or repositioning the flap 208 during cleaning.

With reference now to FIGS. 9A and 9B, the corner portions 60 and the outer mattress shell 20 may be sealed using the bonding strip 192 and a corner weld 220. In the depicted description, multiple bonding strips 192 are used to self-couple the interior surface 50 of the outer mattress shell 20. In order to achieve the depicted description, an incision is made at each of the corner portions 60 of the outer mattress shell 20, and a corner edge is removed at the incision points from each corner portion 60 of the outer mattress shell 20 to define a first side 224 and a second side 226 of each corner portion 60. In this instance, a first bonding strip 228 may be disposed on the first side 224 and a second bonding strip 230 may be disposed on the second side 226. It is generally contemplated that the first and the second bonding strips 228, 230 are coupled together using the corner weld 220, such that the first and second bonding strips 228, 230 at least partially overlap. It is further contemplated that the corner portions 60 can then be sealed with a secondary weld 232. The corner weld 220 and the secondary weld 232 may be radiofrequency welds. The corner weld 220 reduces the likelihood that contaminants may penetrate the outer mattress shell 20 into the mattress 18. As described above, the radiofrequency weld can be used for both the corner weld 220 and the secondary weld 232 so the outer mattress shell 20 has a strong seal allowing liquids to pass over the corner weld 220 and the secondary weld 232 without penetrating the outer mattress shell 20. Accordingly, with the corner weld 220 and secondary weld 232, the caregiver may thoroughly sterilize the outer mattress shell 20 while ensuring the internal padding of the mattress 18 remains undisturbed from outside contaminants to maintain cleanliness standards.

Figure 10:
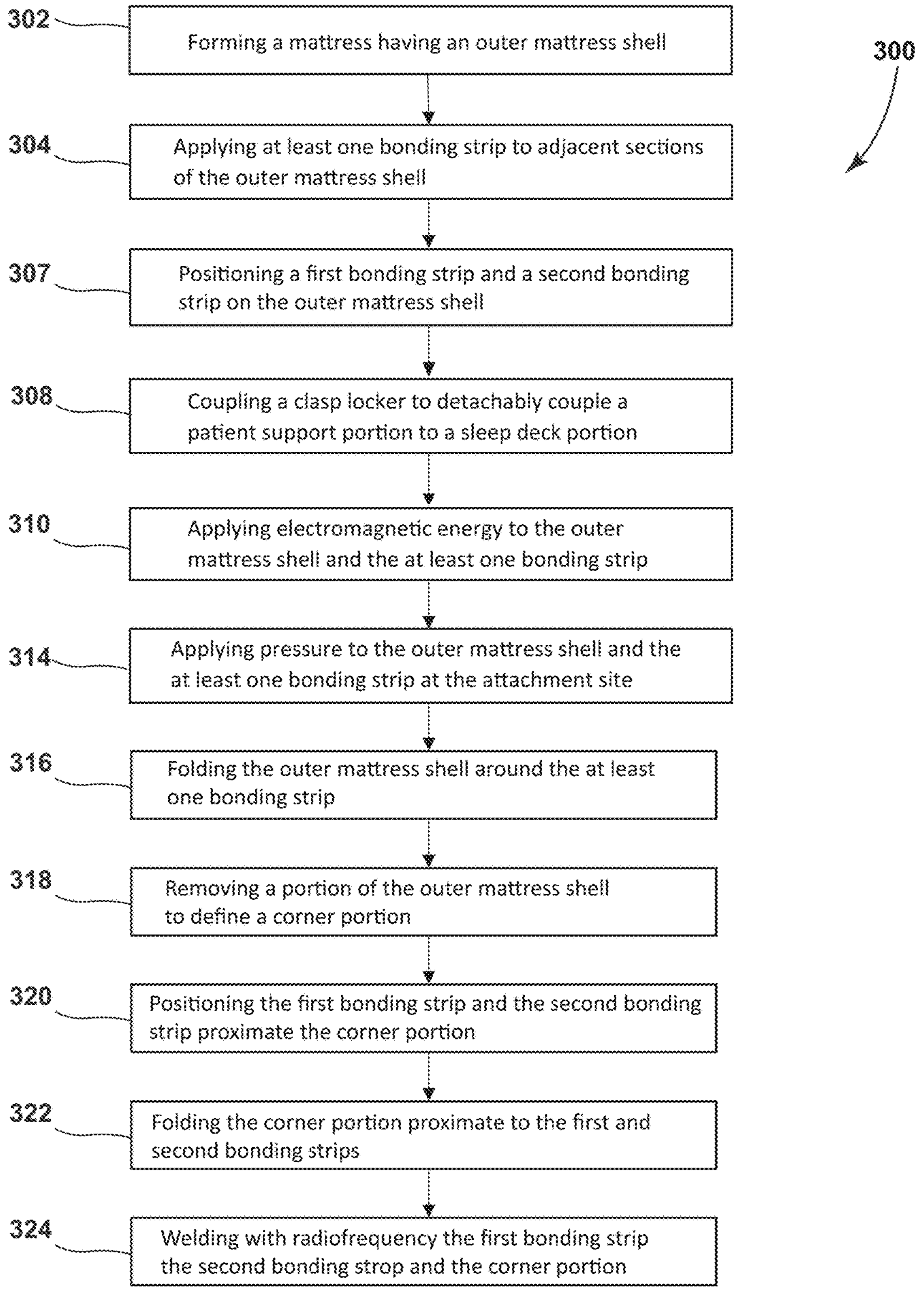
FIG. 10 is a flow diagram of a method for manufacturing a mattress of the present disclosure.

Referring now to FIG. 10, and with further reference to FIGS. 1A-9B, a method 300 for manufacturing the mattress 18 begins with a step 302 of forming the mattress 18 with the outer mattress shell 20, which includes the patient support portion 180 and the sleep deck portion 182. The outer mattress shell 20 defines the interior surface 50 and the exterior surface 52. The method 300 also includes a next step 304 of applying at least one bonding strip 192 to adjacent sections 306 of the interior surface 50 of the outer mattress shell 20. Further, a step 307 includes positioning a first bonding strip 228 and a second bonding strip 230 on the outer mattress shell 20, with the first bonding strip 228 and the second bonding strip 230 being separated by an adjoining section of the outer mattress shell 20.

Next, a step 308 includes coupling the clasp locker 206 to detachably couple the patient support portion 180 to the sleep deck portion 182 proximate the bonding strip 192. A next step 310 includes applying electromagnetic energy to the outer mattress shell 20 and the at least one bonding strip 192 at an attachment site 312 (FIGS. 7A-8B) to operably couple the outer mattress shell 20 with the at least one bonding strip 192. The method 300 may also include a step 314 of applying pressure to the outer mattress shell 20 and the at least one bonding strip 192 at the attachment site 312. A further step 316 includes folding the outer mattress shell 20 around the at least one bonding strip 192 to define a fold 188 of the outer mattress shell 20, positioning a fastening strip 198 proximate to the fold 188, and welding with radiofrequency the fold 188, the at least one bonding strip 192, and the fastening strip 198. Next, a step 318 includes removing a portion of the outer mattress shell 20 to define a corner portion 60. The first bonding strip 228 and the second bonding strip 230 are positioned proximate the corner portion 60 of the outer mattress shell 20 (step 320), and the corner portion 60 is folded proximate to the first and second bonding strips 228, 230, such that the first and second bonding strips 228, 230 at least partially overlap (step 322). The corner portion 60 including the first bonding strip 228 and the second bonding strip 230, may then be welded using radiofrequency (step 324).

According to one aspect of the present disclosure, a hospital bed includes a sleep deck that has an upper portion, a middle portion, and a lower portion that each define a support surface and an underbody that defines a notch. An opening is defined by and extends through the upper portion. A space is defined between at least the upper portion and the middle portion. A mattress is disposed on the support surface of the sleep deck. An outer mattress shell encases the mattress. The outer mattress shell includes a fold that is defined by a weld extending through the outer mattress shell. A mattress retention assembly is operably coupled to the outer mattress shell. The mattress retention assembly includes a first magnet and a second magnet that selectively couples the mattress and the outer mattress shell to the sleep deck.

According to another aspect of the present disclosure, a hospital bed includes a sleep deck that has an upper portion, a middle portion, and a lower portion that each define a support surface and an underbody that defines a notch. An opening is defined by and extends through the upper portion. A space is defined between at least the upper portion and the middle portion. A mattress is disposed on the support surface of the sleep deck. An outer mattress shell encases the mattress. The outer mattress shell includes a fold that is defined by a weld extending through the outer mattress shell. A mattress retention assembly is operably coupled to the outer mattress shell. The mattress retention assembly includes a portion of the mattress retention assembly extends between the outer mattress shell and the sleep deck.

According to yet another aspect of the present disclosure, a hospital bed includes a sleep deck that has an upper portion, a middle portion, and a lower portion that each define a support surface and an underbody that defines a notch. An opening is defined by and extends through the upper portion. A space is defined between at least the upper portion and the middle portion. A mattress is disposed on the support surface of the sleep deck. An outer mattress shell encases the mattress. The outer mattress shell includes a fold that is defined by a weld extending through the outer mattress shell. A mattress retention assembly is operably coupled to the outer mattress shell. The mattress retention assembly includes an affixing member is disposed on the outer mattress shell.

According to still another aspect of the present disclosure, a hospital bed includes a sleep deck that has an upper portion, a middle portion, and a lower portion that each define a support surface and an underbody that defines a notch. An opening is defined by and extends through the upper portion. A space is defined between at least the upper portion and the middle portion. A mattress is disposed on the support surface of the sleep deck. An outer mattress shell encases the mattress. The outer mattress shell includes a fold that is defined by a weld extending through the outer mattress shell. A mattress retention assembly is operably coupled to the outer mattress shell. The mattress retention assembly includes a retention ridge extends through the space that is defined by the sleep deck.

According to another aspect, a mattress retention assembly further includes a first strap operably coupled with a first magnet and a second strap operably coupled with a second magnet. The second magnet of the second strap is selectively coupled with the first magnet of the first strap.

According to another aspect of the present disclosure, a first magnet and a second magnet of a mattress retention assembly are coupled to a strap. The strap extends through an opening defined by an upper portion of a sleep deck.

According to another aspect of the present disclosure, an outer mattress shell includes a handle that is coupled to a strap of a mattress retention assembly. The handle and the strap are coupled to a mattress and the outer mattress shell to a sleep deck.

According to another aspect of the present disclosure, a first magnet of a mattress retention assembly is disposed on a head portion of a outer mattress shell and a second magnet of the mattress retention assembly is disposed on a foot portion of the outer mattress shell. The first magnet and the second magnet each include a material having a coefficient of friction exceeding 0.3μ.

According to another aspect of the present disclosure, a material is disposed on an upper magnetic portion and a lower magnetic portion of a sleep deck.

According to another aspect of the present disclosure, an upper magnetic portion of a sleep deck is coupled to a first magnet and a lower magnetic portion of the sleep deck is coupled to a second magnet.

According to another aspect of the present disclosure, an affixing member of a mattress retention has a coefficient of friction exceeding 0.3μ.

According to another aspect of the present disclosure, a mattress retention assembly includes a hook that has a planar portion and a clasping portion. The planar portion is coupled to an outer mattress shell. The clasping portion is coupled to a sleep deck.

According to another aspect of the present disclosure, a mattress retention assembly includes a retention feature having a planar portion that extends between an outer mattress shell and a sleep deck. The retention feature also has a clasping portion frictionally engaged with a notch defined in an underbody of the sleep deck.

According to another aspect of the present disclosure, a retention ridge includes a port that is configured to receive at least one of a power cord and a data cord from a mattress.

According to still another aspect, a mattress retention assembly includes a locking flap having a flat portion that extends between an outer mattress shell and a sleep deck. The locking flap also includes securing members that are configured to couple a mattress to the sleep deck.

According to another aspect, a footboard includes posts that are operably coupled to securing members of a locking flap and coupled to a lower portion of a sleep deck.

According to another aspect of the present disclosure, a mattress assembly includes a mattress and an outer mattress shell that is covering the mattress and has a patient support portion and a sleep deck portion. The outer mattress shell defines an interior surface and an exterior surface. A bonding strip is coupled to the interior surface of the outer mattress shell. A fastening strip is coupled to the exterior surface of the outer mattress shell. A weld extends through the exterior surface and through the interior surface of the outer mattress shell. A clasp locker is operably coupled to the fastening strip and detachably couples the patient support portion to the sleep deck portion of the outer mattress shell.

According to another aspect, a flap may be coupled to an outer mattress shell via a weld. A bonding strip is disposed between the flap and an exterior surface of the outer mattress shell.

According to yet another aspect, an outer mattress shell includes a fold. A bonding strip is positioned within the fold. The bonding strip and the fold are coupled to an outer mattress shell via a weld.

According to another aspect, a bonding strip includes a first bonding strip and a second bonding strip. The first bonding strip is disposed on a first side of a corner portion of an outer mattress shell and the second bonding strip is disposed on a second side of the corner portion of the outer mattress shell.

According to yet another aspect of the present disclosure, a method for manufacturing a mattress includes forming the mattress that has an outer mattress shell that includes a patient support portion and a sleep deck portion. The outer mattress shell defines an interior surface and an exterior surface. The method further includes applying at least one bonding strip to the interior surface of the outer mattress shell. The method further includes coupling a clasp locker to detachably couple the patient support portion of the outer mattress shell to the sleep deck portion that is proximate the at least one bonding strip. The method further includes applying electromagnetic energy to the outer mattress shell and the at least one bonding strip at an attachment site to operably couple the outer mattress shell with the at least one bonding strip. The method further includes applying pressure to the outer mattress shell and the at least one bonding strip at the attachment site.

According to another aspect, the method applies at least one bonding strip and further comprises the steps of positioning a first bonding strip and a second bonding strip on an outer mattress shell. The first bonding strip and the second bonding strip are separated by an adjoining section of the outer mattress shell.

According to still another aspect, the method further includes removing a portion of an outer mattress shell to define a corner portion. The method further includes positioning a first bonding strip and a second bonding strip proximate the corner portion of an outer mattress shell. The method further including folding the corner portion of an outer mattress shell proximate the first bonding strip and the second bonding strip such that the first bonding strip and the second bonding strip at least partially overlap. A radiofrequency is welded to the corner portion, the first bonding strip, and the second bonding strip.

According to yet another aspect, a method further includes folding an outer mattress shell around the at least one bonding strip to define a fold of an outer mattress shell. The method further includes positioning a fastening strip proximate the fold. The method further includes welding with radiofrequency the fold, the at least one bonding strip, and the fastening strip.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mattress assembly, comprising:

a mattress;

an outer mattress shell covering the mattress and having a patient support portion and a sleep deck portion, the outer mattress shell defining an interior surface and an exterior surface;

a bonding strip coupled to the interior surface of the outer mattress shell;

a fastening strip coupled to the exterior surface of the outer mattress shell;

a weld extending through the exterior surface and through the interior surface of the outer mattress shell; and a clasp locker operably coupled to the fastening strip and detachably coupling the patient support portion to the sleep deck portion of the outer mattress shell.

2. The mattress assembly of claim 1, further comprising:

a flap coupled to the outer mattress shell via the weld, wherein the bonding strip is disposed between the flap and the exterior surface of the outer mattress shell.

3. The mattress assembly of claim 2, further comprising:

a fastening member that secures the flap to the outer mattress shell.

4. The mattress assembly of claim 2, wherein one end of the flap is operably coupled to the weld.

5. The mattress assembly of claim 1, wherein the outer mattress shell includes a fold, and wherein the bonding strip is positioned within the fold, and wherein the bonding strip and the fold are coupled to the outer mattress shell via the weld.

6. The mattress assembly of claim 1, wherein the bonding strip includes a first bonding strip disposed on a first side of a corner portion of the outer mattress shell and a second bonding strip disposed on a second side of the corner portion of the outer mattress shell.

7. The mattress assembly of claim 1, further comprising:

a radio frequency weld coupling the clasp locker to the exterior surface of the outer mattress shell.

8. The mattress assembly of claim 1, wherein the bonding strip is defined by first and second bonding strips that are disposed on a first section and a second section of the interior surface.

9. The mattress assembly of claim 8, wherein the first boding strip and the second bonding strip overlap and are at least partially coupled together.

10. The mattress assembly of claim 1, wherein the weld extends between the patient support portion and the sleep deck portion.

11. A mattress assembly comprising:

a mattress;

an outer mattress shell encasing the mattress, the outer mattress shell including a fold defined by a weld extending through the outer mattress shell; and a mattress retention assembly including a retention feature that has a planar portion extending below the outer mattress shell and a clasping portion, wherein the retention feature includes a raised portion, and wherein the raised portion is integrally formed with the planar portion.

12. The mattress assembly of claim 11, wherein the clasping portion defines a recessed portion of the retention feature.

13. The mattress assembly of claim 11, wherein the clasping portion and the planar portion couple the retention feature to a sleep deck of a hospital bed via a compressive force.

14. The mattress assembly of claim 13, further comprising:

a clasp locker operably coupled to a fastening strip and detachably coupling a patient support portion to the sleep deck portion of the outer mattress shell.

15. The mattress assembly of claim 11, wherein a bonding strip is defined by first and second bonding strips that are disposed on a first section and a second section of an interior surface.

16. The mattress assembly of claim 15, wherein the first boding strip and the second bonding strip overlap and are at least partially coupled together.

17. A method for manufacturing a mattress comprising:

forming said mattress having an outer mattress shell that includes a patient support portion and a sleep deck portion, the outer mattress shell defining an interior surface and an exterior surface;

applying at least one bonding strip to the interior surface of the outer mattress shell;

coupling a clasp locker to detachably couple the patient support portion of the outer mattress shell to the sleep deck portion proximate the at least one bonding strip;

applying electromagnetic energy to the outer mattress shell and the at least one bonding strip at an attachment site to operably couple the outer mattress shell with the at least one bonding strip; and applying pressure to the outer mattress shell and the at least one bonding strip at the attachment site.

18. The method of claim 17, wherein applying at least one bonding strip further comprises the step of:

positioning a first bonding strip and a second bonding strip on the outer mattress shell, wherein the first bonding strip and the second bonding strip are separated by an adjoining section of the outer mattress shell.

19. The method of claim 18, further comprising the steps of:

removing a portion of the outer mattress shell to define a corner portion;

positioning the first bonding strip and the second bonding strip proximate the corner portion of the outer mattress shell;

folding the corner portion of the outer mattress shell proximate the first bonding strip and the second bonding strip such that the first bonding strip and the second bonding strip at least partially overlap; and radiofrequency welding the corner portion, the first bonding strip, and the second bonding strip.

20. The method of claim 17, further comprising the steps of:

folding the outer mattress shell around the at least one bonding strip to define a fold of the outer mattress shell;

positioning a fastening strip proximate the fold; and welding with radiofrequency the fold, the at least one bonding strip, and the fastening strip.

* * * * *